United States Patent
Lewis et al.

(10) Patent No.: US 9,560,110 B1
(45) Date of Patent: Jan. 31, 2017

(54) SYNCHRONIZING SHARED CONTENT SERVED TO A THIRD-PARTY SERVICE

(71) Applicant: Google Inc., Mountain View, CA (US)

(72) Inventors: Justin Lewis, Marina Del Rey, CA (US); Gavin James, Los Angeles, CA (US)

(73) Assignee: GOOGLE INC., Mountain View, CA (US)

( * ) Notice: Subject to any disclaimer, the term of this patent is extended or adjusted under 35 U.S.C. 154(b) by 342 days.

(21) Appl. No.: 14/011,353

(22) Filed: Aug. 27, 2013

(51) Int. Cl.
| | |
|---|---|
| *G06F 15/16* | (2006.01) |
| *H04L 29/08* | (2006.01) |
| *H04L 29/06* | (2006.01) |
| *G06F 17/30* | (2006.01) |
| *H04L 9/32* | (2006.01) |
| *G06Q 30/02* | (2012.01) |

(52) U.S. Cl.
CPC ......... *H04L 67/02* (2013.01); *G06F 17/30893* (2013.01); *G06Q 30/0277* (2013.01); *H04L 9/3213* (2013.01); *H04L 63/08* (2013.01); *H04L 63/0884* (2013.01); *H04L 63/1441* (2013.01)

(58) Field of Classification Search
CPC ............... G06F 17/30893; H04L 63/08; H04L 63/0884; H04L 63/1441; H04L 9/3213; G06Q 30/0277
See application file for complete search history.

(56) References Cited

U.S. PATENT DOCUMENTS

| | | | |
|---|---|---|---|
| 2011/0154130 A1* | 6/2011 | Helander et al. ............... | 714/48 |
| 2012/0210243 A1* | 8/2012 | Uhma ............... | G06F 17/30893 715/744 |
| 2013/0018960 A1* | 1/2013 | Knysz .................. | H04L 65/403 709/204 |
| 2013/0339160 A1* | 12/2013 | Avery et al. ............... | 705/14.73 |

\* cited by examiner

*Primary Examiner* — Chirag R Patel
*Assistant Examiner* — Rachel J Hackenberg
(74) *Attorney, Agent, or Firm* — Lowenstein Sandler LLP

(57) ABSTRACT

A system and method for synchronizing shared content served in embedded inline frames (iframes) via a page on a third-party service is provided. The system includes an iframe request receiver to receive an iframe request from a first iframe embedded in the third-party service in response to a third-party service visitor accessing the first iframe, the iframe request being directed to a content item sourced via a content sharing service; a token analyzer to create or update a token identifying the third-party service visitor and the page; a shared content receiver to receive shared content based on the token; and a shared content transmitter to communicate the shared content to the third-party service, the shared content being communicated with the content retrieved from the content sharing service.

20 Claims, 5 Drawing Sheets

SYNCHRONIZING SHARED CONTENT SERVED TO A THIRD-PARTY SERVICE

BACKGROUND

Content sharing services serve content, such as pictures, videos, text, or combinations thereof, to visitors who access the content sharing service. The content may be sourced from a publisher, automatically generated, or uploaded by one of the visitors to the content sharing service. The content may be represented as digitally encoded information. The content sharing service may store the content, or link to other services and subsequently retrieve the content prior to serving the content to the visitors.

The visitor may employ various techniques to access the content. For example, the visitor may access the content sharing service through a browser. In another example, the visitor may access the content sharing service via an application installed on a mobile device. The visitor may use any sort of device enabled to interact with the content sharing service, such as a personal computer, mobile phone, or an Internet enabled television, for example.

The content sharing service may serve content via a third-party service, such as a blog or social networking site. The third-party service may employ an inline frame (iframe) embedded on a personal page, and serve content via the iframe.

In response to a visitor accessing the iframe, the visitor may be served a thumbnail or a static image associated with the content. When the visitor engages an option to play the content, the iframe may invoke a scripted command based language, such Asynchronous JavaScript (AJAX), to access the content sharing service to retrieve the content to serve.

The third-party service, such as a social network, may provide dynamically created pages by collaboratively provided content via the various visitors to the third-party service. For example, each registered user with the third-party service may have a publically available page in which commercial entities and other visitors may add content. In certain cases, a page may have added content from multiple sources, such as a friend, a group in which the register user is a member of, and a commercial entity seeking exposure to a product or service.

The content sharing service may serve shared content along with content. The shared content may be served before, during, or after the serving of the content. The shared content may be associated with meta information, and when the shared content is clicked-through by a visitor, the visitor may be redirected to additional content associated with the shared content. The shared content may provide information associated with a product or service related to the content.

The content sharing service may monetize serving the shared content. Specifically, the content sharing service may monetize whether the visitor clicked-through the shared content.

In cases where the content sharing service serves content to a third-party service, the content sharing service may also provide shared content as well. Thus, even though the content is not accessed via a portal set up to access the content sharing service, the content sharing service may still realize the benefits of serving shared content.

SUMMARY

A system and method for synchronizing shared content served in embedded inline frames (iframe) via a page on a third-party service is provided. The system includes an iframe request receiver to receive an iframe request from a first iframe embedded in the third-party service in response to a third-party service visitor accessing the first iframe, the iframe request being directed to a content item sourced via a content sharing service; a token analyzer to create or update a token identifying the third-party service visitor and the page; a shared content receiver to receive shared content based on the token; and a shared content transmitter to communicate the shared content to the third-party service, the shared content being communicated with the content retrieved from the content sharing service.

DESCRIPTION OF THE DRAWINGS

The detailed description refers to the following drawings, in which like numerals refer to like items, and in which.

DETAILED DESCRIPTION

Figure 1:
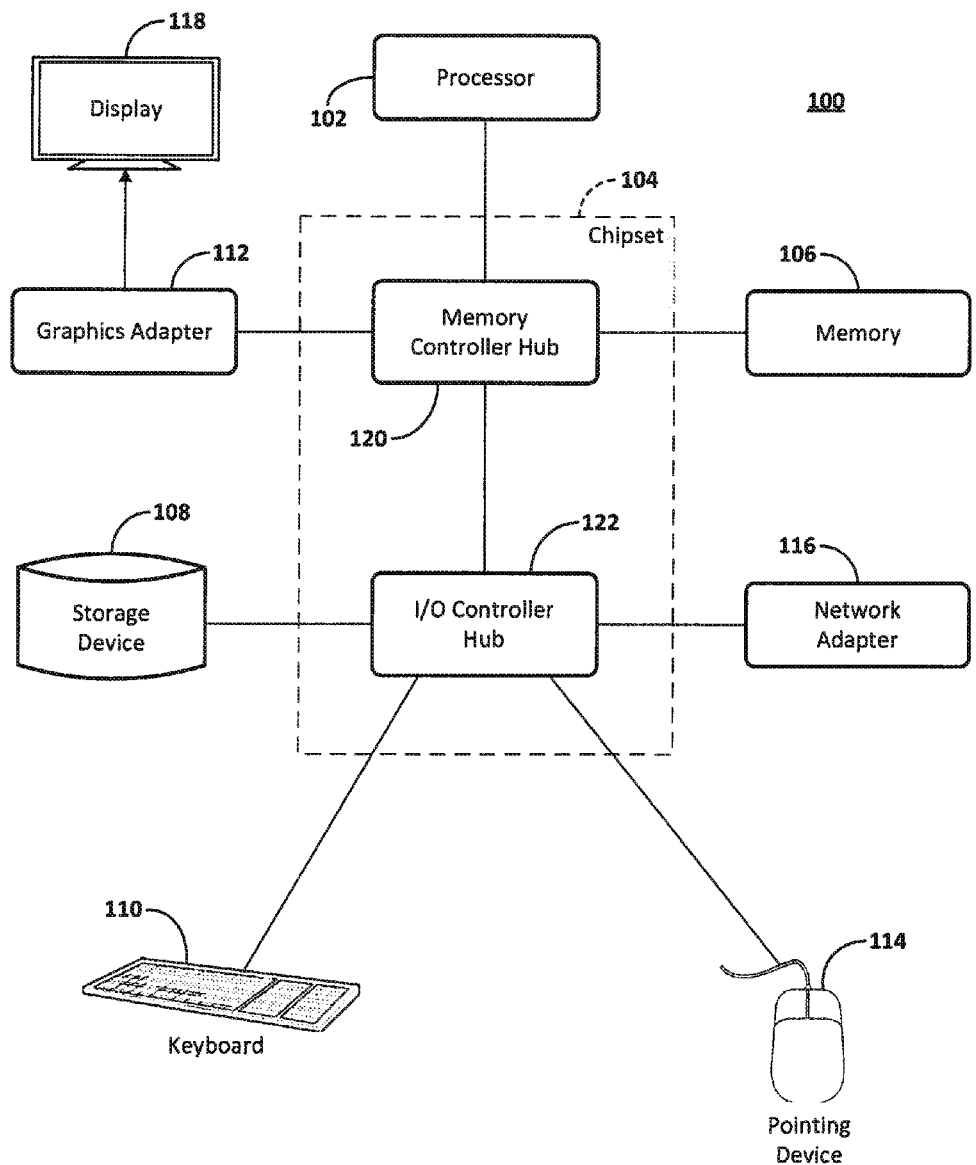
FIG. 1 is a block diagram illustrating an example computer.

Shared content sources pay or request that specific shared content items be display along with a content sharing service's serving of content. The shared content source may pay an amount corresponding to a desired exposure. Thus, the content sharing service may serve specific shared content associated with specific content items contingent on the amount paid.

For example, the content sharing service may determine that a specific content item is viewed one million times, and that another specific content item is viewed one thousand times. In this situation, the content sharing service may require a greater payment to attach shared content to the specific content item being viewed one million times versus the specific content item being viewed one thousand times. The rationale being that the content item being viewed one million times will be accessed more in the future, and thus provide a greater exposure to any associated shared content.

In another example, the shared content source may request that all the shared content on a specific page be directed to shared content from one source. The shared content source may request to ensure that a viewer of a specific page is wholly exposed to the shared content source's products or services while being served content from the content sharing service.

However, in cases where the content sharing service's content is served via embedded iframes on a third-party service, such as a social network, the content sharing service may not be able to provide the service of synchronizing all the shared content on a specific page (such as a third-party service). The content sharing service may not be cognizant that multiple iframes embedded on a single page are sourced on the single page. Thus, the content sharing service may not effectively serve the same shared content, or shared content from one source, via the multiple iframes. Thus, synchronizing all the iframes accessing the content sharing service to serve the same shared content, or shared content from one source, may be frustrated.

The aspects disclosed herein allow a content sharing service, in response to receiving a request by a third-party service for content, to synchronize the shared content so that the shared content accessed on a single page of the third-party service is from the same source. The aspects disclosed herein employ a prioritization technique to ensure that even in situations where multiple iframes embedded on a single page of the third-party service transmits requests, that the single page serves shared content from one source. Thus, in cases where a third-party service employs iframes to distribute content (and shared content), the content sharing service may effectively ensure that the shared content served on a single page may be from the same source.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
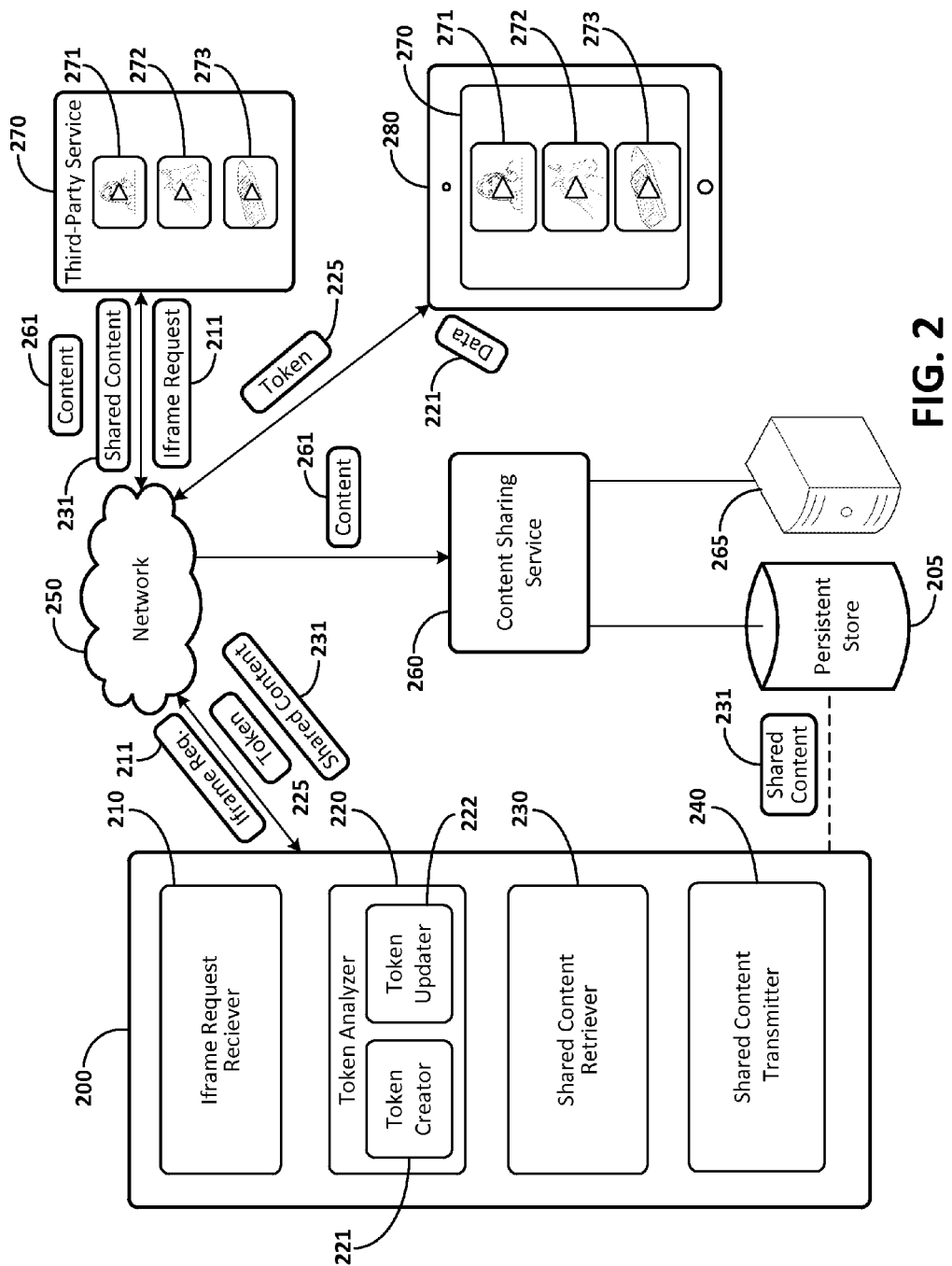
FIG. 2 illustrates an example of a system for synchronizing shared content served in embedded iframes via a page on a third-party service.

FIG. 2 illustrates an example of a system 200 for synchronizing shared content served in embedded iframes via a page on a third-party service 270. The system 200 includes an iframe request receiver 210, a token analyzer 220, a shared content retriever 230, and a shared content transmitter 240. The system 200 may be implemented on a device, such as computer 100. The system 200 interacts with the content sharing service 260 via network 250. Additionally, the system 200 may interact with the third-party service 270 via network 250, or through the content sharing service 260. Alternatively, the system 200 may be implemented along with the content sharing service 260. The content sharing service 260 may be stored on a server, such as server 265. The server 265 may be any sort of computing device, such as computer 100.

The third-party service 270 may be any sort of blog, social networking service, that serves a combination of originally published and user sourced content. The content may be text, images, sounds, videos, or combinations thereof.

As shown in FIG. 2, the third-party service 270 is presently serving three iframes, iframe 271, iframe 272, and iframe 273. The content sharing service 260 provides the iframes, which are embedded content players facilitate content serving via the content sharing service 260. Thus, once activated, each individual iframe may interface via network 250 with the content sharing service 260 to retrieve content, and then, subsequently serve content.

As shown in FIG. 2, a single page of the third-party service 270 may contain three embedded iframes, such as iframe 271, iframe 272, and iframe 273. The iframes, prior to interacting with the content sharing service 260, may serve an image or a representation of the content to be served via the respective iframe. In response to a visitor to the third-party service 270 activating a function to commence access to the content for each respective iframe, the iframe may interface with the content sharing service 260 (i.e. generate an iframe request 211), and subsequently retrieve and serve content. Thus, the third-party service 270 and the content sharing service 260 may not interact with each other until an action is taken.

The iframe request receiver 210 receives an iframe request 211 from any of the iframes embedded on a third-party service 270, such as iframe 271, iframe 272, and iframe 273. The iframe request 211 may include information for a specific content item, indicated by a unique identification or description.

The iframe request 211 may be generated by an action performed on device 280. As shown in FIG. 2, device 280 is a tablet. Device 280 may be any of the devices enumerated above in regards to computer 100. In response to device 280's operator, or an automated signal, indicating that a respective iframe's subject matter is to be served, the respective iframe transmits the iframe request 211 to retrieve content 261 via network 250.

The iframe request 211, once received via system 200, may instigate a retrieval of the content 261 via the content sharing service 260. The content sharing service 260 may retrieve the content 261 via the persistent store 205, or retrieve the content 261 via another service (not shown) accessible via network 250.

As explained above, the content 261 may be presented with shared content 231. The determination of the shared content 231 to be served along with the content 261 is described in greater detail below.

The token analyzer 220, in response to receiving a request via the iframe requestor receiver 210, determines whether to create a token 225 based on the iframe request 211 (via token creator 221), or update a pre-existing token 225 (via token update 222).

A token 225 is a record associated with the device 280 accessing the present page of the third-party service 270. Essentially, the token 225 serves as a cookie file that has at least the following entries: an identification associated with the present page of the third-party service 270 and a unique identifier assigned to the device 280 that accesses the third-party service 270.

Thus, in cases where the token 225 does not exist for the combination of the identification associated the present page and the unique identifier, the token creator 221 creates a token 225. In cases where the token 225 exists, the token 225 is updated.

In certain situations, a race condition may exist. An operator of device 280 may instigate the serving of content via iframe 271 and iframe 272 at the same time, or at times close to each other. In this situation, the token 225 may be implemented with another element to indicate that the first iframe 271 is currently in the process of retrieving shared content. Thus, when system 200 processes iframe 272's request, the system 200 may pause until token 225 is updated to indicate the process of retrieving shared content 231 for iframe 271 has completed.

The token 225 may be stored on the device 280. Alternatively, the token 225 may be stored externally, such as persistent store 205. Further, if the device 280 is logged into the content sharing service 260, the token 225 may be associated with the logged-in device 280.

The token 225 creation may be performed via any of the iframes embedded on the third-party service 270. For example, the token 225 may be transmitted a scripting code, such as AJAX, which would then subsequently create the token 225 associated with the specific single page of the third-party service 270.

The token updater 222 detects a pre-existing token 225 for the specific page of the third-party service 280, and updates the token 225 accordingly. The token updater 222 modifies the token 225 to indicate that an additional iframe is embedded on the page.

For example, if the device 280 accesses the third-party service 270, and instigates iframe 271 to serve associated content 261, a token 225 may be created. After instigating iframe 271, the device 280 may be commanded to instigate iframe 272. In this situation, the token updater 222 may update token 225 to indicate that an additional iframe 272 is associated and embedded on the page of the third-party service 280.

The shared content retriever 230, obtains the token 225 either created or updated by the token analyzer 220, and retrieves shared content 231 from the content sharing service 260. The shared content 231 may be served along with the content retrieved per the iframe request 211. The shared content 231 may be served before, during or after the presentation of the content 261.

The content sharing service 260 may monetize the serving of shared content 231. Further, the content sharing service 260 may monetize a right to the shared content 231 source, so that all, or multiple, iframes embedded on a single page of the third-party service 270 serve shared content 231 from the same source.

In situations where the shared content 231 source has purchased the right, the shared content retriever 230 analyzes the token 225, and determines if shared content 231 has been served on the single page of the third-party service 270.

For example, iframe 271 was previously employed to serve shared content 231. In response to iframe 272 requesting content via the content sharing source 260, the shared content retriever 230 may retrieve shared content 231, or shared content from the source of shared content 231.

In another example, the source of shared content 231 may request to serve multiple shared content items together. For example, the source may request to have three shared content items served in a specific order. In this example, iframe 271 may request content, and be served the first shared content item. At this juncture, token 225 may be created by token creator 221.

Subsequently, iframe 272 may request content as well. The token analyzer may determine that the visitor being served via iframe 272 has already been served content via the single page of the third-party service 280. The shared content retriever 230 may analyze the token 225 to determine how many times shared content 231 (or shared content from the source of shared content 231) has been served on the single page of the third-party service 270. Based on the number of times, the shared content retriever 230 may determine which shared content item to retrieve, and subsequently, serve to iframe 272 the retrieved shared content item. In this way, if the source requests that shared content be served in a specific order, system 200 is able to facilitate this request in response to serving shared content via a single page of a third-party service 280.

The shared content transmitter 240 communicates the retrieved shared content 231 to the requesting iframe. The requesting iframe may serve the shared content 231 along with the requested content 261 prior to, during, or after the serving of the content 261.

Figure 3:
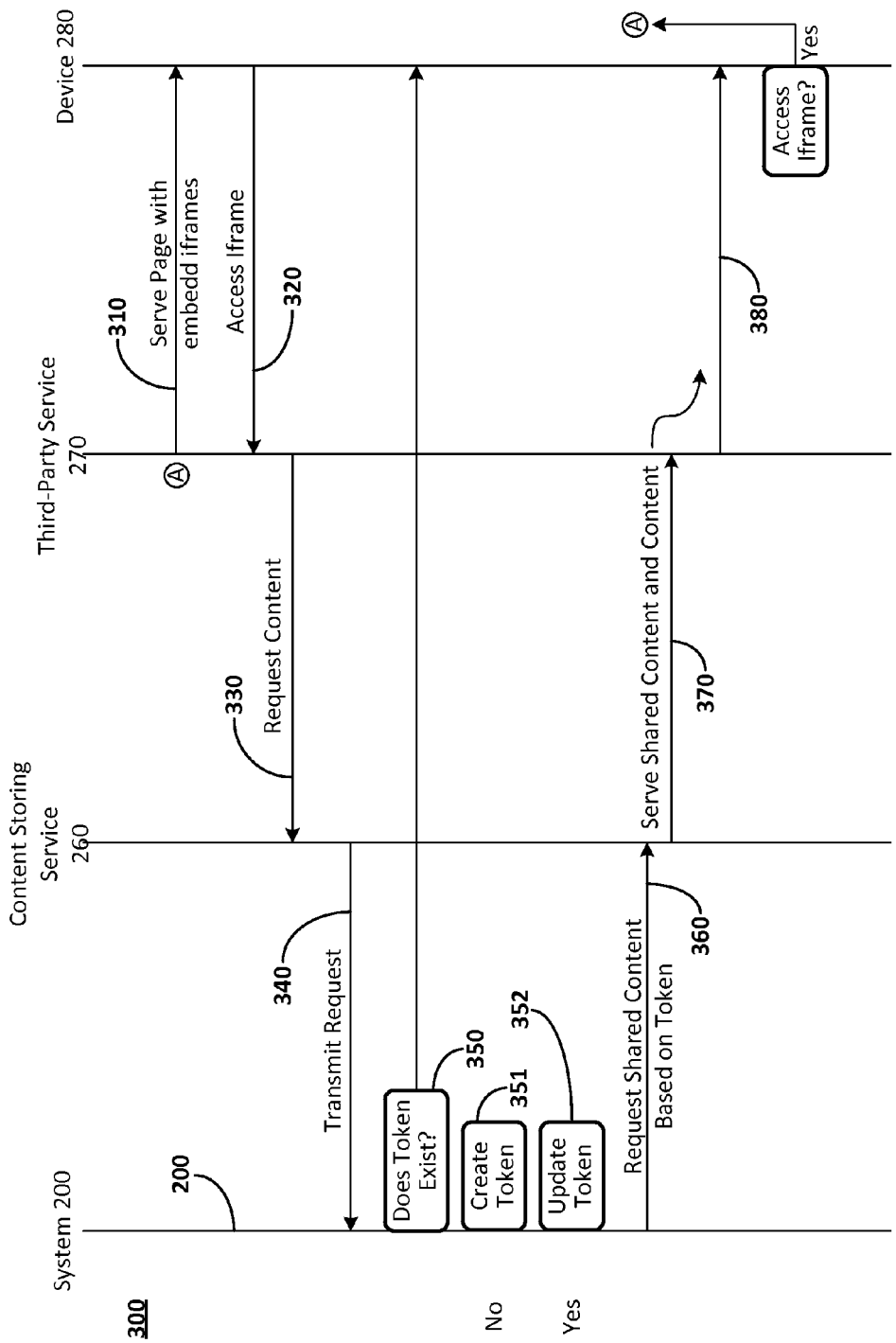
FIG. 3 illustrates an example of a method for synchronizing shared content served in embedded iframes via a page on a third-party service.
Figure 4B:
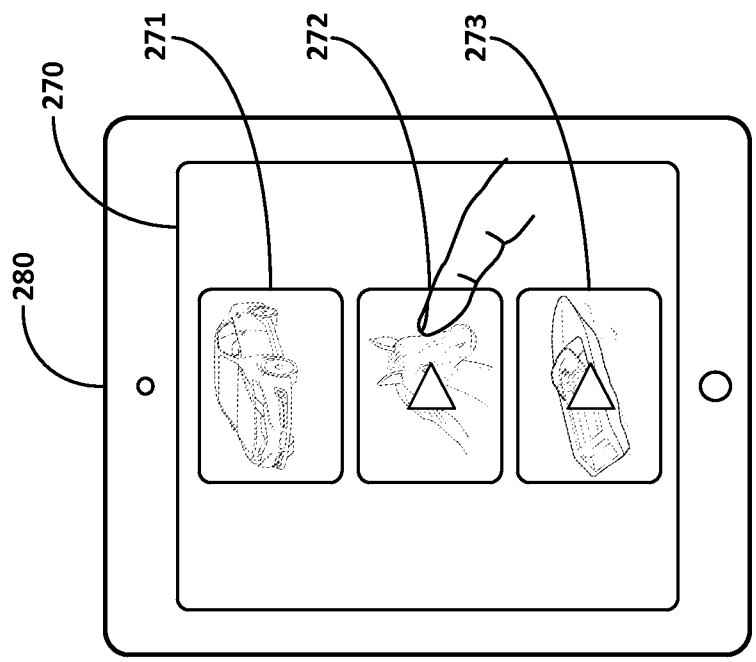
FIGS. 4(a)-(d) illustrate an example implementation of the system depicted in FIG. 2.
Figure 4A:
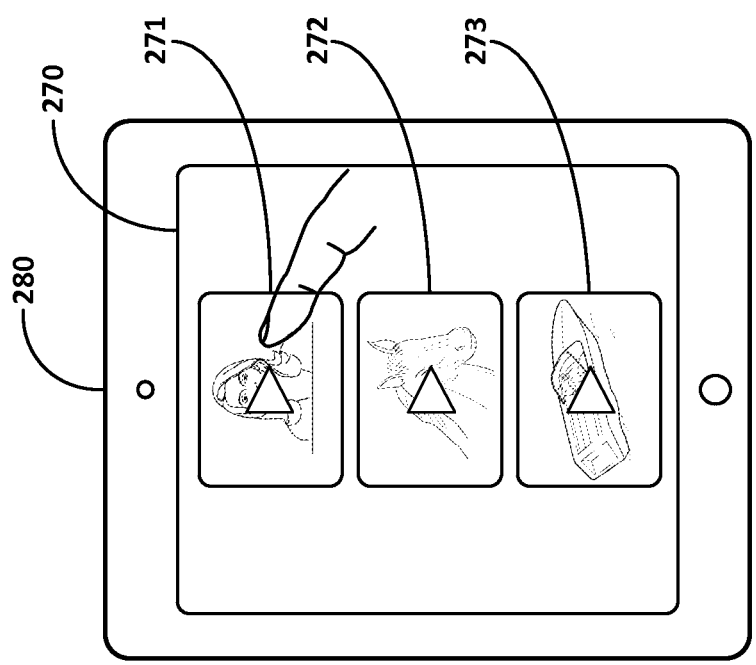
Figure 4D:
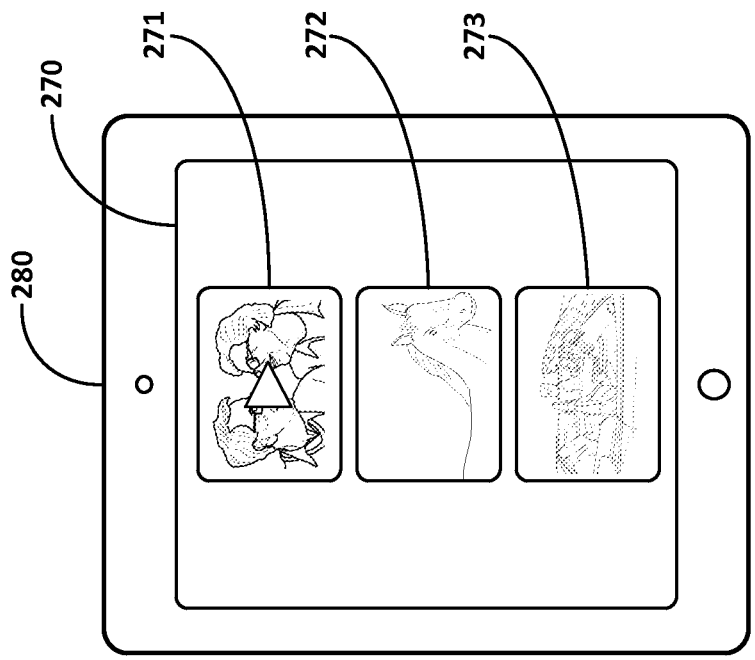
Figure 4C:
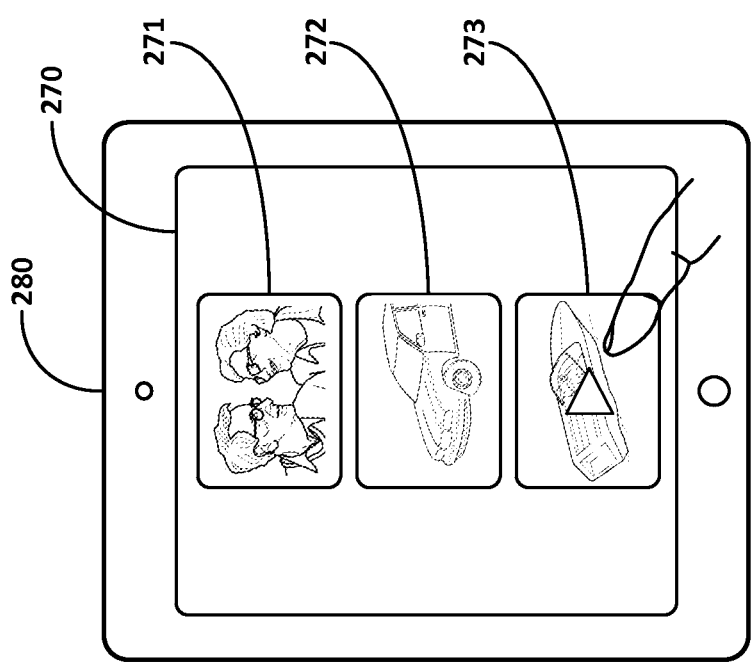

FIG. 3 illustrates an example method 300 for synchronizing shared content served in embedded embedded iframes via a page on a third-party service 270. The method 300 may be implemented via system 200.

In operation 310, a third-party service 270 serves a single page with iframes embedded on the single page. The third-party service 270 may serve the page to a device 280 that access the third-party service 270. Each iframe may indicate a thumbnail or other indications indicating the content served via the iframe.

In operation 320, the device 280 indicates that one of the embedded iframes is accessed. The iframe may be accessed via device 280's operator instigating a command associated with the iframe, such as indicating or clicking on a play button.

In operation 330, the third-party service 260 communicates a request for content from the content sharing service 260. The request may contain identifying information of the content to be retrieved, and associated with the iframe.

The content sharing service 260 relays the request to system 200 (operation 340). Although shown as separate elements in FIG. 2, in certain implementations, the system 200 may be implemented with the content sharing service 260.

In operation 350, the system 200 determines whether a token associated with device 280 for the third-party service 270 presently served page exists. The token may be stored locally on device 280. Alternatively, the token may be stored in a network accessible location, such as a trusted third-party storage location. The token may be a registered file, such as a cookie, associated with the device 280's access history of the third-party service 270.

If the token does not exist, in operation 351, the token is created. Thus, a recordation of accessing the present page, and any embedded iframes is created. If the token does exist, the present access is recorded in the token in operation 352.

In operation 360, shared content is requested based on either the created token, or the updated token. Based on the updated token, the system 200 may determine that the device 280 has previously accessed shared content through another iframe on the presently accessed page. Thus, the system 200 may request shared content from the same source be served to the device 280.

In operation 370, the shared content is served along with the originally requested for content (in operation 320). The shared content and content items are transferred to the iframe embedded on the third-party service 270 (operation 370), and subsequently transmitted to the device 280.

If the operator of device 280 accesses another iframe 280, the method 300 may proceed back to operation 310. Additionally, as indicated above, the method 300 may operate in parallel if multiple iframes are accessed at the same, or similar times. As explained in regards to system 200, an additional entry may be inserted into the token to avoid a race condition.

FIGS. 4(*a*)-(*d*) illustrate an example implementation of the system 200. A device 280 accesses a third-party service 270. The third-party service 270 displays a single page with three embedded iframes. Each of the iframes, when instigated, may request content from the content sharing service 260.

Referring to FIG. 4(*a*), a device 280 accesses, and presents on a screen of the device 280, the contents of a single page of a third-party service 270. As shown, the third-party service 270 is presently serving three embedded iframes, iframe 271, iframe 272, and iframe 273. In FIG. 4(*a*), the operator of device 280 instigates the serving of iframe 271 (as denoted by a finger touching iframe 271).

Referring to FIG. 4(*b*), iframe 271 is now presently serving shared content directed at an automobile. Employing the aspects disclosed herein, a token is created based on the access to the single page of the third-party service 270, and the specific access to iframe 271. In FIG. 4(*b*), the operator of device 280 instigates the serving of iframe 272 (as denoted by a finger touching iframe 272).

Referring to FIG. 4(*c*), iframe 271 is now serving the content associated with the thumbnail displayed in FIG. 4(*a*). Employing the aspects disclosed herein, iframe 272 is now serving shared content directed to an automobile. The shared content may be from the same source of the shared content served in iframe 271 in FIG. 4(*b*). In FIG. 4(*c*), the operator of device 280 instigates the serving of iframe 273 (as denoted by a finger touching iframe 273).

Referring to FIG. 4(*d*), iframe 271 has finished serving content, and goes back to a state of displaying a thumbnail associated with the content to be served via iframe 271. Iframe 272 is now serving the content in which the thumbnail display in FIG. 4(*a*) is directed to. Employing the aspects disclosed herein, iframe 273 is now serving shared content directed to an automobile. The shared content may be from the same source of the shared content served in iframe 271 in FIG. 4(*b*) and in iframe 272 in FIG. 4(*c*).

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system comprising:
a memory;
a processor, coupled with the memory, to:
receive an iframe request from a first iframe of a plurality of iframes embedded in a user interface of a third-party service, the iframe request being received in response to a third-party service visitor accessing the first iframe and the iframe request being associated with a content item sourced via a content sharing service, wherein the plurality of iframes comprise a second iframe;
analyze a token identifying the third-party service visitor and the user interface of the third-party service to determine a source of shared content of the second iframe;
request shared content for the first iframe based on the token, the shared content for the first iframe and the shared content of the second iframe being from the same source and being presented together; and
communicate the shared content for the first iframe to the third-party service to be presented with the content item retrieved from the content sharing service.

2. The system according to claim 1, wherein the processor is further to: create the token based on a record of the token not existing.

3. The system according to claim 2, wherein in response to the second iframe embedded on the user interface the processor to generate a second iframe request and update the token.

4. The system according to claim 1, wherein the user interface is a page of the third-party service and in response to the source of shared content requesting exclusive coverage on the page, the processor to retrieve shared content for each of the plurality of iframes from the same source and communicate the shared content to the second iframe.

5. The system according to claim 1, the user interface is a page of the third party service and wherein in response to the source of shared content requesting exclusive coverage on the page, the processor to retrieve a second shared content from the source.

6. The system according to claim 5, wherein the second shared content is served in succession after a serving of the shared content for the first iframe.

7. The system according to claim 6, wherein the token includes an entry indicating a status of retrieving the shared content for the first iframe in response to the iframe request being a first request from the page, and
the processor to retrieve the second shared content based on the second iframe request after the status indicates that the shared content for the first iframe is retrieved.

8. The system according to claim 1, wherein the token is stored on the device.

9. The system according to claim 1, wherein the token is stored on the content sharing service.

10. A method comprising:
receiving an iframe request from a first iframe of a plurality of iframes embedded in a user interface of a third-party service, the iframe request being received in response to a third-party service visitor accessing the first iframe and the iframe request being associated with a content item sourced via a content sharing service, wherein the plurality of iframes comprise a second iframe;

analyzing a token identifying the third-party service visitor and the user interface of the third-party service to determine a source of shared content of the second iframe;

requesting shared content for the first iframe based on the token, the shared content for the first iframe and the shared content of the second iframe being from the same source and being presented together; and communicating the shared content for the first iframe to the third-party service to be presented with the content item retrieved from the content sharing service;

wherein at least one of the receiving, analyzing, requesting, or communicating being performed on a processor.

11. The method according to claim 10, further comprising: creating the token based on a record of the token not existing.

12. The method according to claim 11, further comprising: updating the token in response to a second iframe embedded on the user interface generating a second iframe request.

13. The method according to claim 10, wherein the user interface is a page of the third party service and in response to the source of the shared content requesting exclusive coverage on the page, retrieving the shared content for each of the plurality of iframes from the same source.

14. The method according to claim 10, wherein the user interface is a page of the third party service and in response to the source of the shared content requesting exclusive coverage on the page, retrieving a second shared content from the source and communicating the second shared content to the second iframe.

15. The method according to claim 14, wherein the second shared content is served in succession after a serving of the shared content for the first iframe.

16. The method according to claim 15, wherein the token includes an entry indicating a status of the shared content for the first iframe in response to the iframe request being a first request from the page, and the retrieving of the shared content based on the second iframe request occurs after the status indicates that the shared content is retrieved.

17. The method according to claim 10, wherein the token is stored on the content sharing service.

18. A non-transitory computer-readable storage medium comprising instructions that cause a processor to:

receive an iframe request from a first iframe of a plurality of iframes embedded in a user interface of a third-party service, the iframe request being received in response to a third-party service visitor accessing the first iframe and the iframe request being associated with a content item sourced via a content sharing service, wherein the plurality of iframes comprise a second iframe;

analyze a token identifying the third-party service visitor and the user interface of the third-party service to determine a source of the shared content of the second iframe;

request shared content for the first iframe based on the token, the shared content for the first iframe and the shared content of the second iframe being from the same source and presented together;

communicate the shared content for the first iframe to the third-party service to be presented with the content retrieved from the content item sharing service; and transmit to the plurality of iframes a scripted based command language to execute the instructions of the system.

19. The non-transitory computer readable medium according to claim 18, wherein the scripted based command language is asynchronous JavaScript (AJAX).

20. The system according to claim 1, wherein shared content from the same source are associated with at least one of a same product, a same service, or a same publisher.

* * * * *